United States Patent [19]

Press

[11] Patent Number: 4,494,776
[45] Date of Patent: Jan. 22, 1985

[54] JOINT FOR PLASTIC LINED LIGHT-WEIGHT METAL PIPING

[75] Inventor: Irving D. Press, West Orange, N.J.

[73] Assignee: UMC Industries, Inc., Stamford, Conn.

[21] Appl. No.: 496,883

[22] Filed: May 23, 1983

[51] Int. Cl.³ ............................ F16L 9/14; F16L 23/00
[52] U.S. Cl. ................................... 285/55; 285/367
[58] Field of Search ................ 285/55, 367, 407, 366, 285/365, 411, 410

[56] References Cited

U.S. PATENT DOCUMENTS

| 3,335,758 | 8/1967 | Bertolet, Jr. | 285/55 X |
| 4,281,859 | 8/1981 | Davies | 285/55 |
| 4,288,105 | 9/1981 | Press | 285/55 |
| 4,313,625 | 2/1982 | West | 285/55 |

Primary Examiner—Richard J. Scanlan, Jr.
Attorney, Agent, or Firm—Hopgood, Calimafde, Kalil, Blaustein & Judlowe

[57] ABSTRACT

A seal load ring having a radial face and a tapered face is installed between the flared gasket portion of the piping plastic liner and the frusto-conically flared flange end of a section of light-weight metal piping. The radial face of the ring is provided with a plurality of concentric circular grooves to resist plastic cold flow, and the connection is effected by a split V-clamp.

7 Claims, 6 Drawing Figures

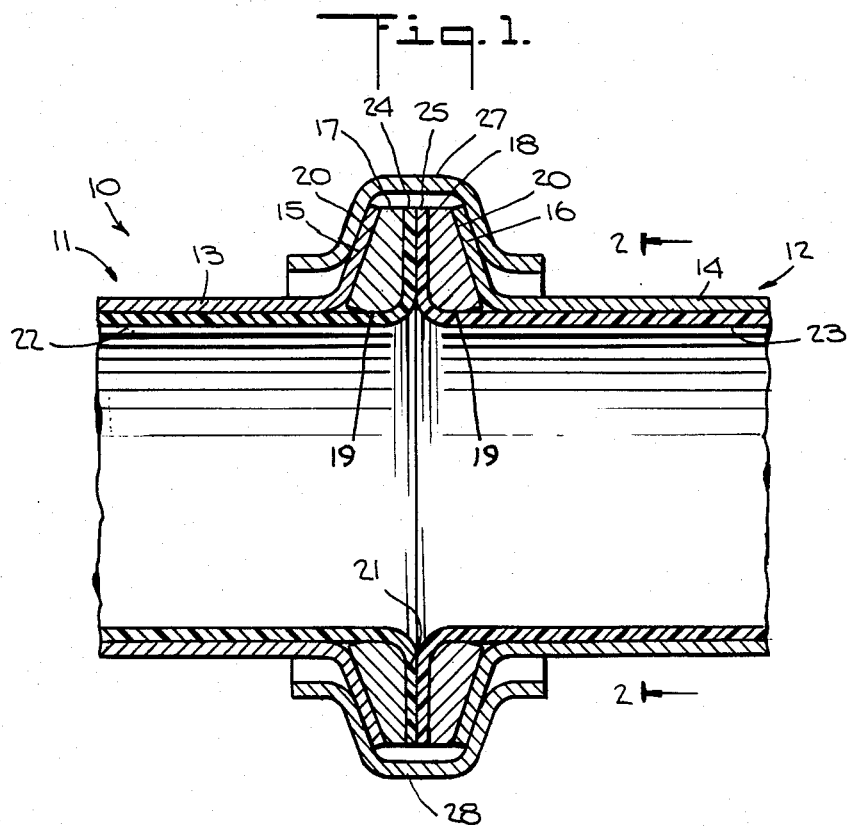
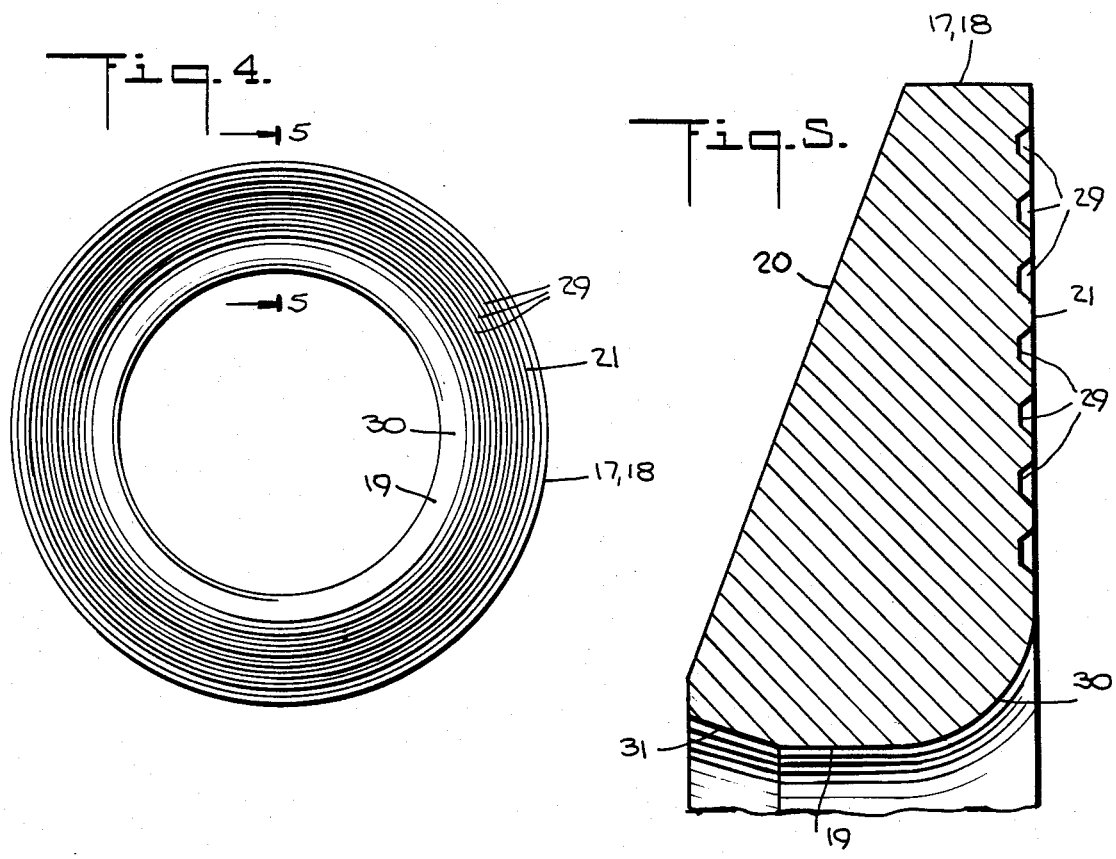

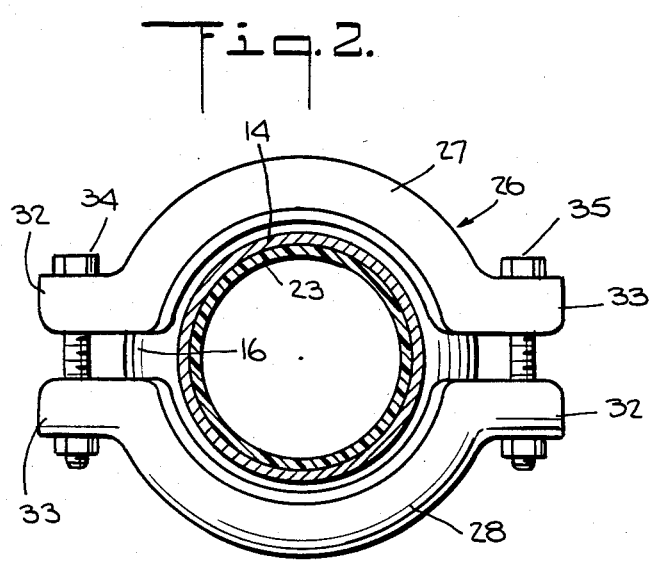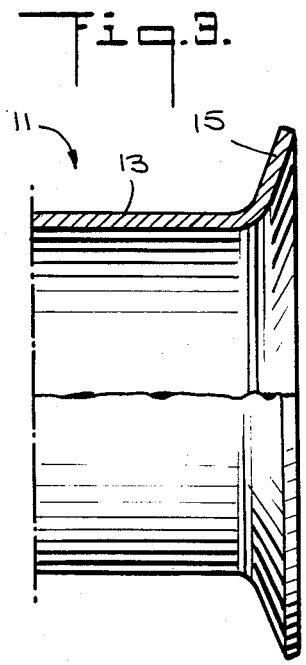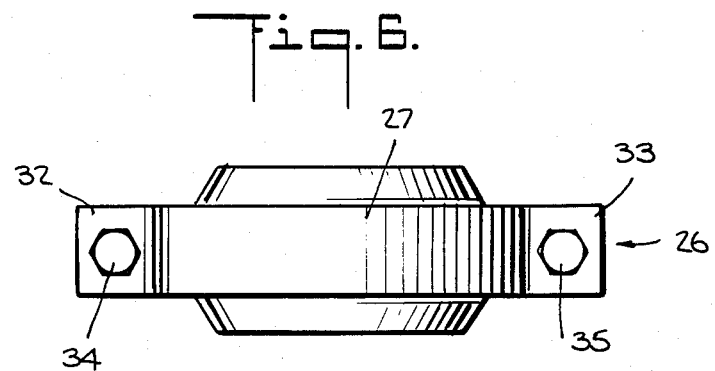

JOINT FOR PLASTIC LINED LIGHT-WEIGHT METAL PIPING

BACKGROUND OF THE INVENTION

The present invention relates to fluid piping systems and more particularly to piping systems of the type wherein a metallic housing is lined with a non-metallic material selected from the group consisting of elastomers and plastomers.

Lined piping systems of the foregoing type that are presently in use are generally fabricated from Schedule 40 or Schedule 80 steel and lined with various chemically resistant plastics having nominal wall thicknesses usually ranging from about 0.054" for ⅛" pipe to about 0.185" for a 12" pipe for TFE resin, and thicker for other resins such as heavy duty polypropylene. Occasionally, Schedule 10 steel has been used. Generally, connections are made between sections of such pipe by flange joints, in which case the lining is brought out of the pipe and flared over the face of the flange both to protect the metal from the fluids being carried and to serve as a gasket. The flanges have been predominantly of the bolted kind, and at one time it was considered desirable to include a fibrous backup washer around the liner between the metal flange face and the overlying plastic flare to compensate for cold flow of the plastic.

The known piping is quite heavy, and bolting up standard flanges requires considerable man hours to effect a typical installation. However, there has been a general reluctance in the market place to trust joints other than bolted flanges. Nevertheless, there is a need, particularly in the light of rising costs of capital improvements, for a lighter weight, more quickly assembleable, plastic lined piping system.

An attempt in this direction is represented by the pipe assembly disclosed in U.S. Pat. No. 4,313,625 issued Feb. 2, 1982. The abstract of said patent refers to a lined pipe assembly wherein the lined pipe and liner are deformed to provide an outwardly flaring flange, a loose tapered ring is disposed on the pipe adjacent the flange and the pipe is joined to a similar pipe or cast fitting by means of a split "V" clamp. However, loose rings are the bane of the workman. If they are made sufficiently snug to restrict travel along the pipe there is the risk that they will hang up on the pipe when the joint is assembled preventing the development of a uniformly sealed joint. Therefore, a certain looseness is required and it becomes a problem to hold the rings in place until the "V" clamp can be installed.

There are additional drawbacks to the construction disclosed in said patent and these will be mentioned below when describing the present invention.

SUMMARY OF THE INVENTION

With the foregoing disadvantages in mind, it is an object of the present invention to provide a more reliable and more versatile piping connection for light-weight lined piping systems that is easier to assemble and that has no loose rings to contend with.

In accordance with the invention there is provided a lined piping assembly comprising in combination a component of light-weight metal piping having a connector portion flared radially outwardly at less than 90° to form a frusto-conical flange; a seal load ring having an inside diameter matching that of said connector portion, a tapered face engaging the outer concave face of said flange, and a radial face on the side away from said tapered face; a plastic pipe lining extending out of said connector portion, through said load ring, where it is flared radially outwardly over said radial face of the ring to form a gasket portion and thereby trap said load ring; and a V-clamp for encircling said frusto-conical flange and engaging the convex side thereof behind said concave face to compress said plastic gasket portion against a mating surface of another component.

BRIEF DESCRIPTION OF THE DRAWINGS

The invention will be better understood after reading the following detailed description of the presently preferred embodiment with reference to the appended drawings wherein the same reference numerals are used throughout to designate the same or similar parts and in which:

FIG. 1 is a longitudinal sectional view through a piping assembly illustrating a jont embodying the present invention;

FIG. 2 is a transverse sectional view taken along line 2—2 in FIG. 1;

FIG. 3 is a fragmentary view, in quarter section, of the end of a section of pipe having an end flange for incorporation in the assembly of FIG. 1;

FIG. 4 is a plan view of the radial face of a seal load ring as used in the assembly of FIG. 1, and showing the concentric annular grooves formed therein;

FIG. 5 is an enlarged fragmentary sectional view taken along line 5—5 in FIG. 4 and showing a preferred configuration for the grooves in the seal load ring as well as other details thereof; and FIG. 6 is a top plan view of the V-clamp component shown in section and elevation in FIGS. 1 and 2.

DETAILED DESCRIPTION OF THE PREFERRED EMBODIMENT

Referring to the drawings, a lined piping assembly constructed in accordance with the present invention is shown in FIG. 1. While the invention will be understood to be applicable to any disconnectable joint formed in an overall piping system, it is most conveniently described with reference to the connection of two pipe ends.

The joint or assembly is designated generally by the reference numeral 10 and functions to connect one component, 11, of light-weight metal piping to another component, 12. The piping components 11 and 12 consist, respectively, of a section of light-weight metal pipe 13 and 14 having connector or end portions 15 and 16 flared radially outwardly at less than 90° to form a frusto-conical flange. It is presently preferred to use a flare angle of about 70° for the flanges 15 and 16. Details of the pipe end 11 can best be seen in FIG. 3, it being understood that the end 12 is identical although facing in the other direction in FIG. 1.

Each pipe end is provided with a respective seal load ring 17 and 18. The rings 17 and 18 are identical and are shown in detail in FIGS. 4 and 5. They have an inside diameter at 19 that substantially matches the inside diameter of the pipe ends or connector portions 13 and 14, a tapered face 20 that engages the outer concave face of the flange 15 or 16, and a radial face 21 on the side away from the tapered face 20. The taper angle of face 20 should be substantially equal to that of the flanges 15 and 16, namely, 70°.

A plastic lining, respectively 22 and 23, extends out of the connector portion 13 and 14, through the corresponding load ring 17 and 18, where the plastic is flared radially outwardly at 24 and 25 over the radial face 21 of the respective ring 17 and 18 to form a gasket portion and thereby trap the respective load ring 17 and 18.

A V-clamp 26, consisting of separate halves 27 and 28, encircles the frusto-conical flanges 15 and 16 engaging the convex side of each flange behind the concave face to compress the plastic gasket portion 24 against the mating surface of another component, here the other gasket portion 25.

In flanged joints used in plastic lined piping systems, a frequent problem is cold flow of the plastic in the gasket region resulting in eventual leakage. To avoid this problem the seal load rings 17 and 18 are preferably provided with a plurality of concentric grooves 29 in the radial face thereof, the details of which are best seen in FIG. 5. When the assembly is tightened by tightening the V-clamp, the plastic from the gasket portions 24 and 25 is forced into the grooves 29. This prevents the plastic from drawing inward from between rings 17 and 18. Being able to provide the grooves 29 is an advantage not obtainable with the embodiment described in said prior patent because the patented assembly has the plastic directly engaging the flanged pipe end rather than a separate ring.

Referring to FIG. 5, it will be seen that the seal load rings 17 and 18 have a radiused surface 30 connecting the radial face 21 with the cylindrical surface 19. This surface 30 provides a smooth back-up for the flared liner avoiding sharp edges that might cut through the liner.

The opposite side of the ring 17 or 18 has a slight chamfer 31 leading in to the surface 19 which chamfer serves to pilot the ring onto the plastic liner during the assembly operation and before flaring of the projecting end of the liner.

The V-clamp is conventional in construction having lug ends or ears 32 and 33 through which bolts 34 and 35 are passed to join the clamp halves. Suitable steps should be taken when assembling the clamp to take up the bolts equally so that the clamp provides uniform wedging action around the entire circumference of the joint.

Presently, it is preferred to use Schedule 10 metal piping components for which the plastic lining for a 2" pipe, when made from polytetrafluoroethylene (TFE) resin, is about 0.062" thick, and when made from fluorinated ethylene propylene (FEP) resin, is about 0.080" thick.

Having described the present invention with reference to a presently preferred embodiment thereof, it should be evident to those skilled in the subject art that various changes in construction can be effected without departing from the true spirit of the invention as defined in the appended claims. It should also be understood that the flanged connector portions that are joined need not be at the ends of lengths of pipe but can be at the ends of a stub section of such piping component formed integral with various fittings, valves, vessels or the like. The metal flange can be formed without fear of damaging the plastic liner which can best be added after the metal is flared. The load ring is then installed and the plastic thereafter flared to form the gasket portion and entrap the load ring.

What is claimed is:

1. A lined piping assembly comprising in combination a component of light-weight metal piping having a connector portion flared radially outwardly at less than 90° to form a frusto-conical flange; a seal load ring having an inside diameter substantially matching that of said connector portion, a tapered face engaging the outer concave face of said flange, and a radial face on the side away from said tapered face; a plastic pipe lining extending out of said connector portion, through said load ring, where it is flared radially outwardly over said radial face of the ring to form a gasket portion and thereby trap said load ring; and a V-clamp for encircling said frusto-conical flange and engaging the convex side thereof behind said concave face to compress said plastic gasket portion against a mating surface of another component.

2. A lined piping assembly according to claim 1, characterized in that said radial face of the load ring is formed with annular grooves into which plastic from said gasket portion is forced when said V-clamp is tightened to anchor said gasket portion against cold flow.

3. A lined piping assembly according to claim 1, characterized in that said other component consists of another plastic lined light-weight metal piping connector portion with a radially outwardly flared frusto-conical flange, a load ring with tapered and radial faces and a plastic lining projecting from said other connector portion through said other load ring where it is flared radially outwardly over the radial face of the load ring to trap said load ring and form another gasket portion, and said V-clamp also engages the convex side of the other frusto-conical flange behind its outer concave face compressing together the two gasket portions of the respective plastic linings to form a joint with the load rings sandwiched between the respective frusto-conical flages and gasket portions.

4. A lined piping assembly according to claim 3, characterized in that the radial face of each load ring is formed with annular grooves into which plastic from the corresponding gasket portion is forced when said V-clamp is tightened to anchor said gasket portions against cold flow.

5. A lined piping assembly according to claim 1, characterized in that the taper angle of said tapered face of said load ring is about 70°.

6. A lined piping assembly according to claim 3, characterized in that the taper angle of each of said load rings is about 70°.

7. A lined piping assembly according to claim 6, characterized in that the radial face of each load ring is formed with annular grooves into which plastic from the corresponding gasket portion is forced when said V-clamp is tightened to anchor said gasket portions against cold flow.

* * * * *